(12) United States Patent  
Tanaka

(10) Patent No.: US 8,164,425 B2
(45) Date of Patent: Apr. 24, 2012

(54) INTERROGATOR USED IN RFID SYSTEM

(75) Inventor: Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1195 days.

(21) Appl. No.: 11/591,101

(22) Filed: Nov. 1, 2006

(65) Prior Publication Data

US 2007/0052524 A1 Mar. 8, 2007

Related U.S. Application Data

(63) Continuation of application No. PCT/JP2004/010644, filed on Jul. 27, 2004.

(51) Int. Cl.
*H04Q 5/22* (2006.01)

(52) U.S. Cl. ...................................... 340/10.2

(58) Field of Classification Search ............... 340/10.2, 340/10.1, 10.3, 9.11, 9.12, 9.13, 10.4, 10.42
See application file for complete search history.

(56) References Cited

U.S. PATENT DOCUMENTS

| | | | |
|---|---|---|---|
| 5,528,621 A | 6/1996 | Heiman et al. | |
| 6,027,027 A | 2/2000 | Smithgall | |
| 7,248,837 B2* | 7/2007 | Woo | 455/69 |
| 2005/0099269 A1* | 5/2005 | Diorio et al. | 340/10.51 |

FOREIGN PATENT DOCUMENTS

| | | |
|---|---|---|
| JP | 8-265832 | 10/1996 |
| JP | 8-265832 | 11/1996 |
| JP | 9-46753 | 2/1997 |
| JP | 2000-20651 | 1/2000 |
| JP | 2000-283367 | 10/2003 |
| JP | 2004-48288 | 2/2004 |

OTHER PUBLICATIONS

International Search Report dated Sep. 14, 2004.
Supplementary European Search Report dated Apr. 14, 2009, from the corresponding European Application.
Communication pursuant to Article 94(3) EPC dated Jul. 16, 2009, from the corresponding European Application.
Notice of Rejection Ground mailed Nov. 4, 2008, from the corresponding Japanese Application.

* cited by examiner

*Primary Examiner* — Brian Zimmerman
*Assistant Examiner* — Yong Hang Jiang
(74) *Attorney, Agent, or Firm* — Fujitsu Patent Center

(57) ABSTRACT

In RFID system having a plurality of reader/writers, the interface between the reader/writers can be reduced without any degradation of communication throughput. The plurality of reader/writers transmit/receive radio signals to/from RF tags. The reader/writers inform their operation modes to each other, whereby they can recognize the usage statuses of channels for communication with the RF tags. If a channel selected by a particular reader/writer is occupied by another reader/writer for a long time, the particular reader/writer selects another channel immediately. If a channel selected by a particular reader/writer is temporarily occupied by another reader/writer, the particular reader/writer waits for a release of that channel.

13 Claims, 10 Drawing Sheets

| OPERATION MODE INFORMATION |
|---|
| PERSISTENT OPERATION MODE / TEMPORARILY OPERATION MODE |

F I G. 3 A

| CHANNEL NUMBER | STATUS INFORMATION | READER/WRITER ID |
|---|---|---|

F I G. 3 B

| CHANNEL NUMBER | USAGE STATUS | READER/WRITER ID |
|---|---|---|
| 1 | NORMAL BUSY | 001 |
| 2 | PERSISTENT BUSY | 005 |
| 3 | CHANNEL SEARCH | 009 |
| 4 | NORMAL BUSY | 002 |
| ⋮ | | |
| N | NOT USED | — |

F I G. 4

INTERROGATOR USED IN RFID SYSTEM

CROSS REFERENCE

This is a continuation of an international application of PCT/JP2004/010644, which was filed on Jul. 27, 2004.

BACKGROUND OF THE INVENTION

1. Field of the Invention

The present invention relates to an RFID system comprising a plurality of interrogators, and specifically relates to a technology to reduce influence caused by interference between the plurality of interrogators.

2. Description of the Related Art

A system such that ID information written in a tiny IC chip is read without touching the IC chip has been put to practical use in recent years. Since such a type of system usually utilizes radio wave in the radio-frequency band to transmit/receive signals, the system is referred to as RFID (Radio Frequency Identification) system.

An RFID system comprises an interrogator and a transponder. The interrogator accesses IC chips serving as a transponder and reads information (e.g. ID information) stored in the IC chips. The interrogator often writes information in the IC chips. For that reason, in the following description, the interrogator is referred to as a "reader/writer". The transponder is an IC chip in which unique ID information is written, and is often referred to as various names such as an IC tag, a radio IC tag, an RFID tag, an electronic tag, and a radio tag. In the following description, however, the transponder is referred to as an "RF tag".

In an RFID system, the reader/writer sends a radio signal (radio wave) for propagating interrogation information to an RF tag. The RF tag returns the information requested in the interrogation information to the reader/writer. Alternatively, the RF tag writes the information sent with the interrogation information in a memory. Note that the RF tag comprises a function for generating electrical power from a radio signal transmitted from the reader/writer. However it is also known that some RF tags incorporate batteries.

As described above, a radio signal is transmitted/received between the reader/writer and the RF tag in the RFID system. Particularly in the embodiment where electrical power is generated in an RF tag by using the radio signal transmitted by the reader-writer, the power of the radio signal transmitted from the reader/writer needs to be considerably large. For that reason, in the RFID system comprising a plurality of reader/writers provided proximity of each other, interference is caused between the reader/writers, and data reading function may be deteriorated. Here, "interference between reader/writers" is such that a signal from an RF tag in an interrogation area of one reader/writer receives influence of a signal transmitted from other reader/writer under an environment that a plurality of reader/writers use the same frequency.

As a technology for solving the problem, Patent Document 1, for example, describes a method of time-sharing control so that communication timing of a plurality of reader/writers does not overlap each other. However, although this method can prevent the interference between reader/writers from occurring, a plurality of reader/writers cannot perform communication simultaneously, accordingly the throughput of the whole system is deteriorated. In addition, Patent Document 1 assumes a system with only one channel between the reader/writer and the RF tag.

Patent Document 2 describes a configuration where a reader/writer detects interference wave (exogenous noise) in advance, and communication is controlled based on the result. However, although details of detection method of the interference wave are described, the document fails to describe details of how the influence of the interference wave can be removed when it is detected.

In addition, it is also possible to employ a method for preventing interference between reader/writers by introducing a frequency hopping. However, since the frequency hopping requires a wide bandwidth, it is sometimes difficult to adopt in Japan and Europe. In Europe, for example, the band assigned for RFID is 0.25 MHz (869.4-869.65 MHz of UHF band). A configuration using a directional antenna and a configuration in which radio wave shield is prepared are also possible to employ; however, any of above is not effective for reducing the cost.

Patent Document 1: Japanese Patent Application Publication No. 2003-283367 (Paragraphs 0002-0010, FIG. 8)
Patent Document 2: Japanese Patent Application Publication No. 2004-48288 (Paragraphs 0013, Abstract)

SUMMARY OF THE INVENTION

It is an object of the present invention to prevent interference between reader/writers without reducing communication throughput in an RFID system comprising a plurality of reader/writers.

The interrogator of the present invention is used in an RFID system in which usage status information indicating the usage status of the channel for wireless communication with an RF tag is transferred between a plurality of interrogators. The RFID system comprises a selection unit for selecting a channel from a plurality of channels in the RFID system, an interference level detection unit for detecting the interference level of the channel selected by the selection unit, a determination unit for determining whether the selected channel is usable or not on the basis of the usage status information of the selected channel notified from other interrogator and the interference level of the selected channel detected by the interference level detection unit, a communication unit for performing wireless communication with an RF tag using the selected channel when the selected channel is usable, and a channel change unit for causing the selection unit to select another channel when the selected channel is not usable.

According to the present invention, each interrogator recognizes the status of each channel by the usage status information transferred among interrogators. Each interrogator selects the channel for communication with RF tags, and then determines whether or not the selected channel is usable on the basis of channel usage status notified from other interrogator in addition to the interference level of the selected channel. Therefore, the interrogator can efficiently determine whether or not the channel is usable.

The usage status information might include, for example, a first communication state indicating the channel is occupied continuously for long time, a second communication state indicating the channel is temporarily used, and a non-communication state. In such a case, if the selected channel is under the first state, long waiting time is predicted until the channel is released, therefore, another channel is immediately selected without waiting for the channel to be released. If the selected channel is the second state, the predicted waiting time until the channel to be released is short and the channel is waited to be released. As a result, channel search efficiency is enhanced, and communication throughput is improved.

BRIEF DESCRIPTION OF THE DRAWINGS

FIG. 3A is an example of operation mode information;

FIG. 3B is an embodiment of a packet transmitted/received between reader/writers;

FIG. 4 is an embodiment of a status management table;

DESCRIPTION OF THE PREFERRED EMBODIMENTS

Figure 1:
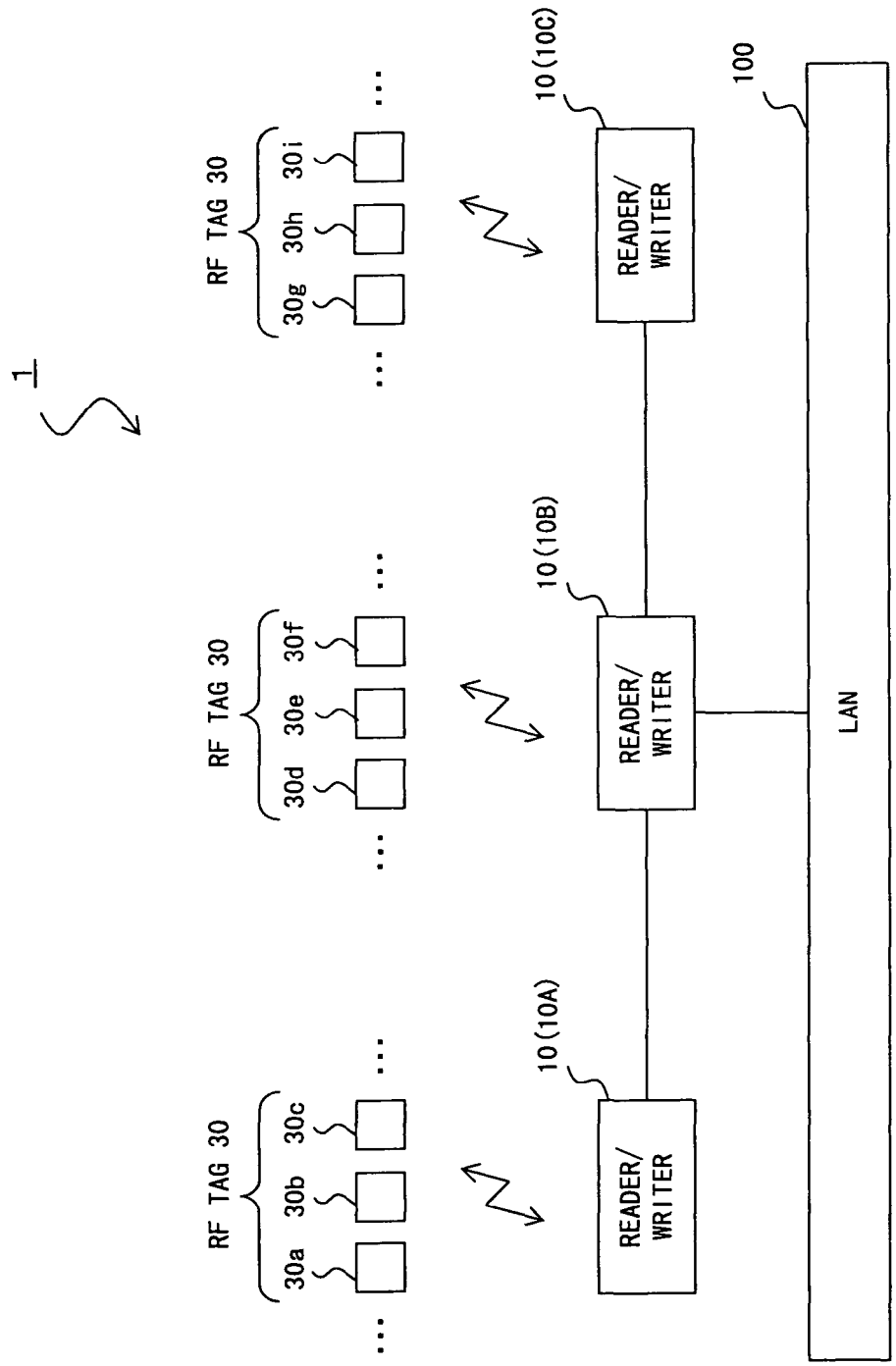
FIG. 1 is a diagram showing the configuration of the RFID system relating to the embodiment of the present invention.

FIG. 1 is a diagram showing the configuration of the RFID system relating to the embodiment of the present invention. An RFID (Radio Frequency Identification) system 1 comprises a plurality of reader/writers 10 (10A, 10B, 10C), and LAN 100 for connecting the plurality of reader/writers 10. Each of the reader/writers 10 transmits/receives a radio signal to/from corresponding RF tags 30 (30a-30c, 30d-30f, 30g-30i).

The reader/writer 10 is an interrogator, which transmits interrogation information to the RF tags 30 and requests the reply of the corresponding information (e.g. ID information added to each RF tag). The reader/writer 10 can write prescribed information in the RF tag 30. On the other hand, the RF tag 30, which is a transponder having a memory, extracts corresponding information from the memory in accordance with interrogation information from the reader/writers 10 and returns the information. The RF tag 30 can write the information received from the reader/writer 10.

The RFID system 1 provides a plurality of channels for radio communication between the reader/writers 10A-10C and the RF tags 30a-30i. Each channel is assigned with a unique radio frequency. Each of the reader/writers 10 selects one available channel from a plurality of channels, and performs communication with the RF tags using the channel. However, depending on the countries or areas, the frequency bandwidth available for RFID is narrow in general. For that reason, the number of channels, which can be provided for communication between the reader/writer and the RF tag is relatively small. Therefore, in a RFID system comprising many reader/writers (i.e. a RFID system with the number of the reader/writers greater than that of the channels), one channel has to be shared by a plurality of reader/writers. The following description assumes an RFID system, which needs to share one channel by a plurality of reader/writers.

Each of the reader/writers 10 notifies other reader/writers of its own operation state by utilizing the LAN 100. Note that the LAN 100 can be a wired network, can be a wireless network, or can be a network comprising them. A communication protocol on the LAN 100 is not limited in particular.

Figure 2:
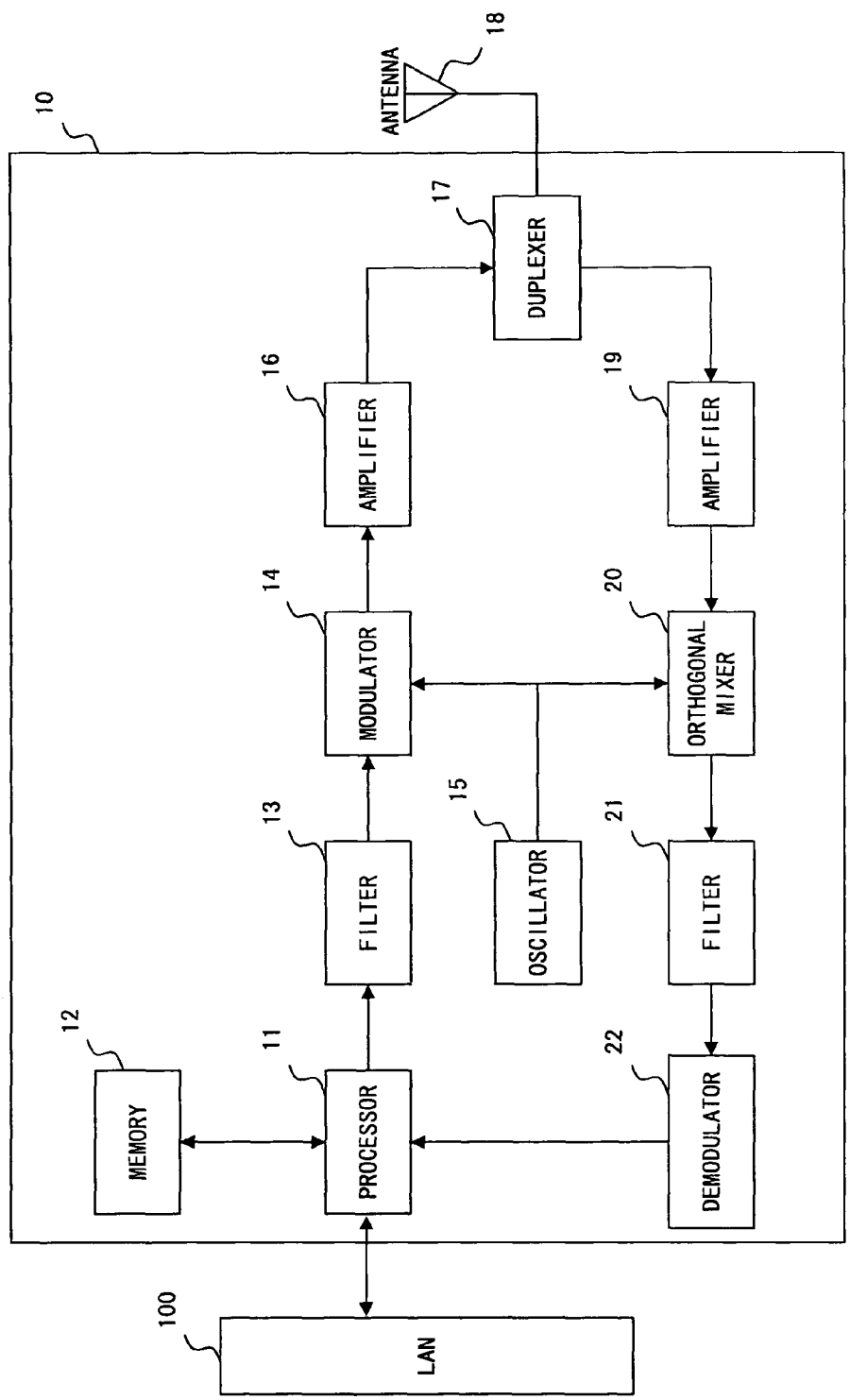
FIG. 2 is a diagram of the configuration of a reader/writer.

FIG. 2 is a diagram of the configuration of a reader/writer 10. The reader/writer 10 is connected to the LAN 100, and transmits/receives signal to/from RF tags 30 via wireless communication link (i.e. channel).

A processor 11 generates the interrogation information to be transmitted to the RF tags (or, information to be written in the RF tags 30) by executing a program stored in a memory 12, and stores the information received from the RF tags 30 in the memory 12 (or forwards the information to a host computer not shown in the drawing via the LAN 100). The processor 11 selects a channel for transmitting/receiving a signal to/from the RF tags 30 from a plurality of channels provided by the RFID system 1. Furthermore, the processor 11 transmits/receives information via the LAN 100 to/from the other reader/writer and the host computer not shown in the drawings.

The memory 12 includes nonvolatile memory area and RAM area. The nonvolatile memory area stores programs describing the operation of the reader/writers 10, and so on. The RAM area, while being used as a work area of the processor 11, stores drive mode information and a status management table described later.

A filter 13 removes unnecessary components from the output of the processor 11. A modulator 14 modulates the output of the filter 13 by using a clock signal generated by an oscillator 15. An amplifier 16 amplifies the signal modulated by the modulator 14. A duplexer 17 directs the signal amplified by the amplifier 16 to an antenna 18. The signal is transmitted to the RF tags 30 via the antenna 18. In this description, the oscillator 15 is a variable frequency oscillator, and generates a clock signal with a frequency corresponding to the channel selected by the processor 11. Therefore, the reader/writers 10 can transmits the radio signal at the frequency assigned to the channel selected by the processor 11.

The signal received via the antenna 18 is directed to an amplifier 19 by the duplexer 17. The amplifier 19 amplifies the received signal. An orthogonal mixer 20 extracts a corresponding signal component from the received signal by using the clock signal generated by the oscillator 15. At this point, the oscillator 15 generates a clock signal with a frequency corresponding to the channel selected by the processor 11. Consequently, the signal with a frequency assigned to the channel selected by the processor 11 is extracted by the orthogonal mixer 20. The output of the orthogonal mixer 20 is sent to a demodulator 22 via a filter 21. The demodulator 22 demodulates the output of the filter 21, and recovers information received from the RF tags.

The processor 11 can detect the power of the received wave with respect to a frequency assigned to the selected channel. In this case, the power of the received wave may be detected based on, for example, digital data obtained by A/D converting the output of the orthogonal mixer 20 or the filter 21.

As described above, the reader/writers 10 transmits/receives a radio signal to/from the RF tags 30 by using the channel selected from a plurality of channels provided by the RFID system 1.

A reader/writer 10 is applicable to various uses. For example, in a system of reading RF tags attached to products carried on a belt conveyer in a production line, a reader/writer 10 needs to read the RF tags continuously during the time period when the belt conveyer is operating. That is, in such a case, the reader/writer 10 needs to continuously occupy the channel for radio communication with RF tags for a long time period. Meanwhile, for example, in a system of reading RF tags attached to products on the shelves, the reader/writer 10 only needs to occupy the channel for radio communication with the RF tags temporarily.

In RFID system 1, a plurality of channels are shared by a plurality of reader/writers 10; however, in the present embodiment, the number of reader/writers is larger than the number of channels provided by the RFID system 1. For that reason, each of the reader/writers 10 needs to search for available (or unused) channel at the start of communication with the RF tags 30.

However, when a reader/writer (request reader/writer) accesses a channel to start communication, if the channel is used by other reader/writer for a use, which requires long-time continuous occupation, the request reader/writer cannot obtain the channel for a while. That is, in such a case, it is preferable that the request reader/writer immediately accesses to another channel without waiting for the release of the occupied channel. On the other hand, when the request reader/writer accesses a channel, and if the channel is used by other reader/writer for a use, which requires temporarily occupation, the request reader/writer can obtain the channel in a relatively short time. That is, in such a case, it is preferable that the request reader/writer waits for the channel to be released without accessing other channels. As explained above, when a reader/writer accesses a channel to start communication, if the usage status can be obtained, the channel search can be performed effectively. Hence, the RFID system 1 of the embodiment of the present invention seeks to improve the efficiency of the channel search by notification of the usage status of the channel between the reader/writers 10.

FIG. 3A is an example of operation mode information set to each of the reader/writers 10. The operation mode information indicates a persistent operation mode or a temporarily operation mode. Here the persistent operation mode is an operation mode, which occupies a channel for communication with the RF tags 30 continuously for long time. The temporarily operation mode is an operation mode, which occupies a channel for communication with the RF tags 30 temporarily. Each of the reader/writer 10, when using a channel, notifies other reader/writers of its own operation status (i.e. channel usage status) in accordance with the operation mode information. Note that the operation mode of each of the reader/writer 10 is determined by a user of the RFID system 1, and is set to the memory 12, for example. The operation mode may be a fixed setting or can be changed as necessary.

FIG. 3B is an embodiment of a packet transmitted/received between reader/writers. Note that the packet is transferred via the LAN 100.

"Channel Number" identifies a channel occupied for communication between the reader/writer 10 and the RF tags 30, or a channel accessed for measuring interference level. "Status information" indicates a usage status of the channel identified by the channel number. The indicated usage status of the channel includes normal busy, persistent busy, or measurement busy. The "normal busy" indicates a status where a reader/writer 10, to which the temporarily operation mode is set, occupies the channel for communication with the RF tags 30. Meanwhile, the "persistent busy" indicates a status where a reader/writer 10, to which the persistent operation mode is set, occupies the channel for communication with the RF tags 30. The "measurement busy" indicates a situation where a reader/writer 10 accesses the channel for channel search. If a reader/writer 10 does not use (or access) any of the channels, "non communication" is set as "status information". "Reader/writer ID" indicates an identification number attached to each of the reader/writers 10.

The above packet is broadcast to other reader/writers from each of the reader/writes 10 via the LAN 100. By so doing, each of the reader/writers 10 recognizes the usage status of each channel.

FIG. 4 is an embodiment of a status management table. The status management table is a table for managing the status of each channel provided by the RFID system 1, and is generated on the memory 12 of each of the reader/writers 10. The status management table is updated by the information notified by the packet shown in FIG. 3B.

In the packet shown in FIG. 4, for example, information indicating "normal busy state and used by the reader/writer (001)" is registered for Channel 1. Information indicating "persistent busy state and used by the reader/writer (005)" is registered for Channel 2. Additionally, information indicating "accessed by the reader/writer (009) for channel search" is registered for Channel 3. Therefore, each of the reader/writers 10 can recognize the status of each channel provided by the RFID system 1.

Figure 5:
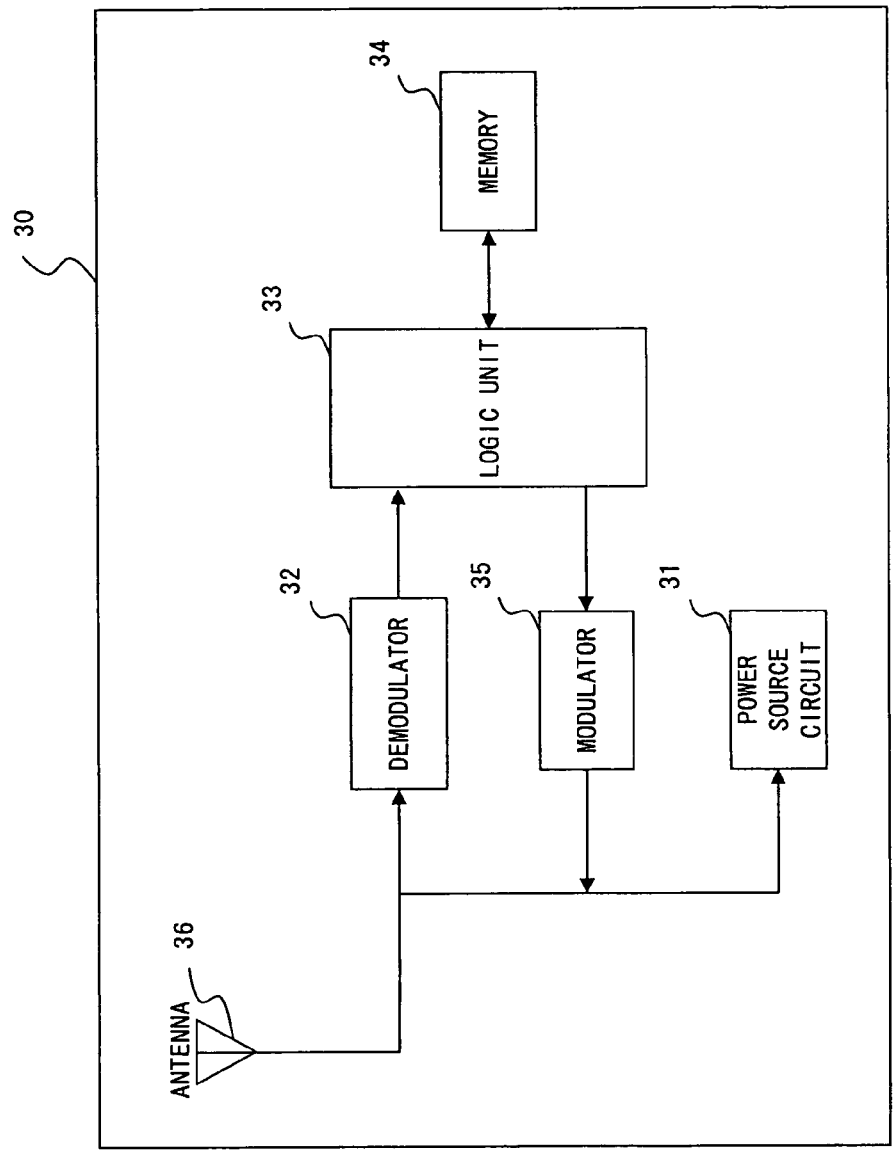
FIG. 5 is a diagram showing the configuration of an RF tag.

FIG. 5 is a diagram showing the configuration of the RF tag 30. The RF tag 30 transmits/receives a signal to/from the reader/writer 10 via a wireless communication link (i.e. a channel).

A power source circuit 31 includes a rectification circuit, and generates DC power by rectifying radio wave (radio signal) received via an antenna 36. The power is supplied to a demodulator 32, a logic unit 33, a memory 34, and a modulator 35. The demodulator 32 demodulates the radio signal transmitted from the reader/writer 10. The logic unit 33 analyzes the demodulated signal, and performs the corresponding processing. For example, when interrogation information is received from the reader/writer 10, ID information stored in the memory 34 is read out. Note that the logic unit 33 may be realized by a hardware circuit, or may be realized by a software circuit executing a program described in advance. The memory 34 is nonvolatile memory, and stores ID information attached uniquely to each of the RF tags. Note that information received from the reader/writer 10 can be written in the memory 34. The modulator 35 modulates the signal representing ID information read out from the memory 34. The modulated signal is transmitted to the reader/writer 10 via the antenna 36.

As described above, the RF tag 30 returns the ID information attached uniquely to the RF tag 30 in accordance with the interrogation from the reader/writer 10.

Next, the operation of the reader/writer 10 is explained. In the following description, the explanation centers on the procedures to obtain a channel for transmitting/receiving the radio signal to/from the RF tags.

Figure 6:
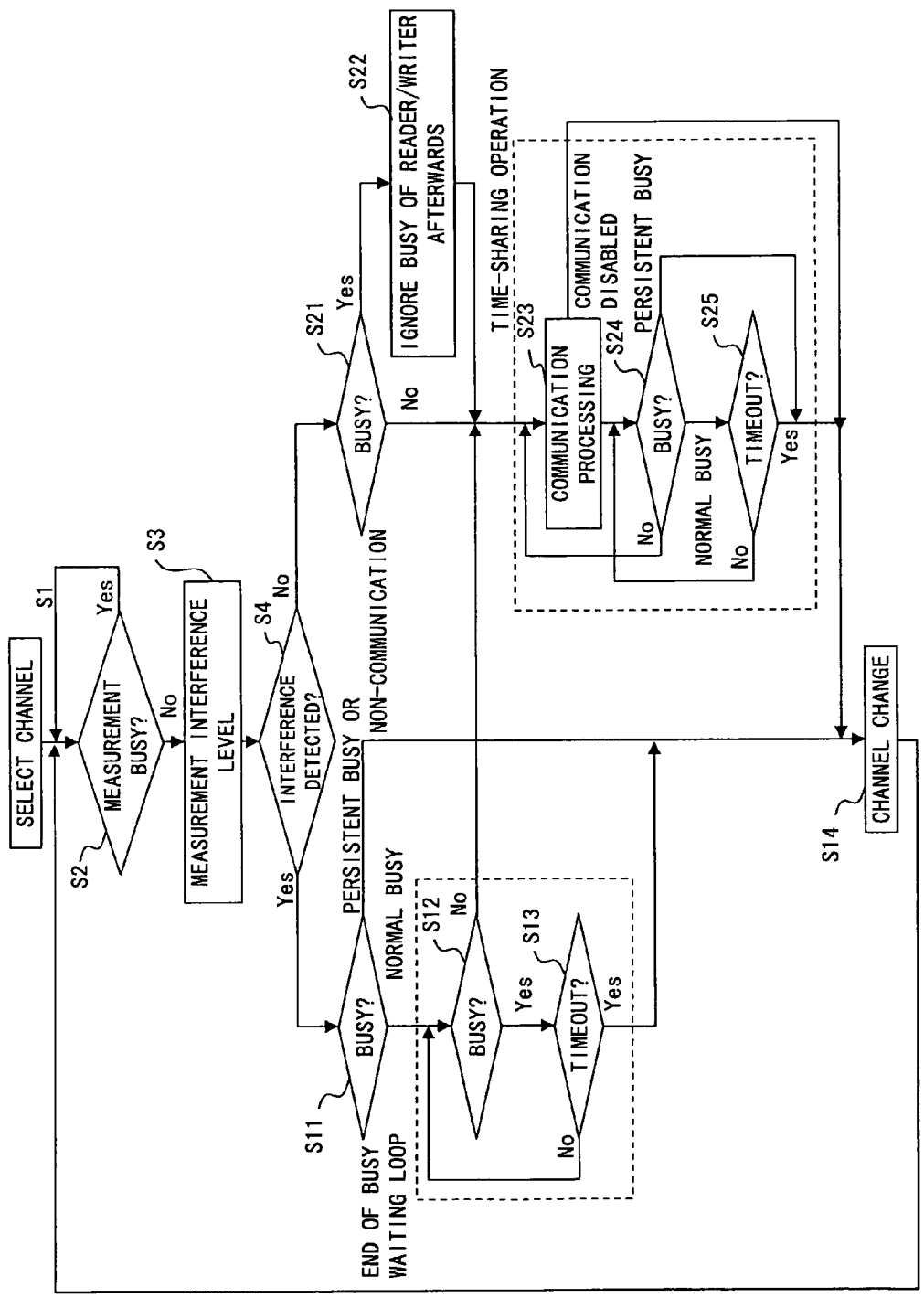
FIG. 6 is a flowchart showing the operation of the reader/writer.

FIG. 6 is a flowchart showing the operation of the reader/writer 10. The processing in the flowchart is started by power ON of the reader/writer 10, and executed by the processor 11.

In step S1, an arbitrary channel is selected from a plurality of channels provided by the RFID system 1. In step S2, with reference to the status management table shown in FIG. 4, whether or not the channel selected in step S1 or the channel selected in step S14, explained later, is in a channel search state is determined. Note that in the following description, the channel selected in step S1 or step S14 are referred to as "selected channel". If the selected channel is not in the channel search state, the processing proceeds to step S3. On the contrary, if the selected channel is in the channel search state, it is determined that other reader/writer is accessing the channel for channel search, and the processing waits for the end of the search processing. Consequently, channel search (i.e. interference level measurement) in one channel by a plurality of reader/writers at the same time can be prevented. Accordingly, collision between channels can be avoided. In other words, if a plurality of reader/writers measure the interference level of one channel at the same time, and the interference level is less than a threshold in any of the reader/writers, the plurality of reader/writers would start the communication at the same time using the channel, causing a possibility of communication error. On the contrary, by introducing the procedure of step S2, the plurality of reader/writers 10 do no start communication at the same time using one channel, and therefore reduction of the communication throughput can be avoided.

In steps S3-S4, interference level of the selected channel is detected. If the interference level exceeds a predetermined threshold, the processing proceeds to step S11, and if the interference level is at the threshold or less, the processing proceeds to step S21.

Figure 7A:
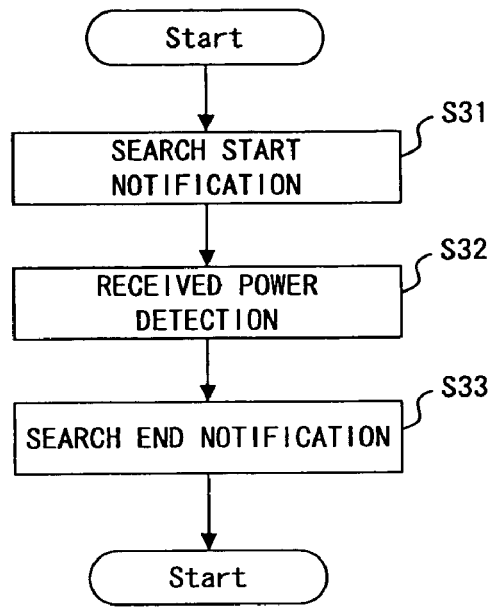
FIG. 7A is a detailed flowchart of the interference measurement processing.

FIG. 7A is a detailed flowchart of the interference measurement processing in step S3. In step S31, a packet for notifying other reader/writers of channel search start is generated and transmitted. The packet can be obtained by setting a number for identifying the selected channel as "channel number" and by setting "measurement busy" to "status information" in FIG. 3B. In step S32, received power of the selected channel frequency is detected. In step S33, a packet for notifying other reader/writers of the end of channel search is generated and transmitted. The packet is obtained by setting a number for identifying the selected channel as "channel number" and by setting "non-communication" to "status information" in FIG. 3B.

The processing in steps S11-S13 is executed when the interference level of the selected channel exceeds the threshold. Here, the situation that the interference level exceeds the threshold may occur when the selected channel is used by other reader/writer or when external noise unrelated to the RFID system 1 is present.

In step S11, with reference to the status management table shown in FIG. 4, the status of the selected channel is determined. If the selected channel is under the "persistent busy" or "non-communication", the processing proceeds to step S14. In step S14, the next channel is selected from the plurality of channels provided by the RFID system 1, and the processing returns to step S2. In other words, if the selected channel is under the "persistent busy", the channel is estimated to be occupied continuously for long time by other reader/writer, and therefore, the next channel is immediately selected. If the selected channel has high interference level albeit the "non-communication", it is estimated that the interference is caused by an external factor unrelated to the RFID system 1. In this case, the selected channel cannot be used without removing the external factor. Therefore, in this case also, the next channel is selected immediately. As above, when it is predicted that the selected channel cannot be used for long time, the next channel is selected immediately, and thus, the time required for obtaining the available channel can be reduced.

In step S11, if the selected channel is under the "normal busy", it is estimated that the selected channel is occupied temporarily by another reader/writer, and processing in steps S12-13 is executed. In steps S12-S13, whether or not the selected channel is released (i.e. whether the busy state ends or not) within a prescribed time period is monitored. Note that when another reader/writer finishes using the selected channel, a packet with setting of "non-communication" as the "status information" is broadcast via the LAN 100, release of the selected channel can be detected by receiving the packet. If the selected channel is released within the prescribed time period, the processing proceeds to step S23, and communication with the RF tags 30 via the selected channel is performed. On the other hand, if the selected channel is not released within the prescribed time period, the processing proceeds to step S14 and the next channel is selected.

When the interference level of the selected channel is at the threshold or less (step S4: NO), the processing in step S21 is executed. In step S21, with reference to the status management table shown in FIG. 4, whether or not the selected channel is under the "busy (including the normal busy and the persistent busy)" is checked. If the selected channel is not under the "busy", it is determined that the selected channel is not used by any of the reader/writers, and the processing proceeds to step S23 to perform communication with the RF tags 30. On the other hand, the selected channel is under the "busy", although another reader/writer is using the selected channel, the interference level is low, and therefore, the processing to ignore the busy status is performed in step S22.

For example, assume that the reader/writer 10A shown in FIG. 1 is to execute the flowchart in FIG. 6. It is also assumed that the reader/writers 10A and 10B are provided so as to be close to each other, whereas the reader/writers 10A and 10C are not close to each other. Note that the external noise unrelated to the RFID system 1 is not present.

In such a case, when the reader/writer 10A selects a channel and performs the processing in step S2 and after on the selected channel, if the reader/writer 10B has already used the selected channel, the determination in step S4 would be "Yes", and steps S11-S13 described above are executed. If neither of the reader/writers 10B nor 10C uses the selected channel, the determinations in both steps S4 and S21 would be "No", and the communication with the RF tags 30 is immediately started. In addition, if the reader/writer 10C has already used the selected channel, after being determined to be "No" in step S4, step S21 is executed. In this case, although another reader/writer (i.e. the reader/writer 10C) has already used the selected channel, since the reader/writers 10A and 10C are not close to each other, the influence of the radio wave output by the reader/writer 10C on the reader/writer 1A is small (step S21: Yes). Consequently, in this case, the reader/writer 10A, even if another reader/writer is using the selected channel, can use the selected channel. In other words, a plurality of reader/writers can use the same channel at the same time, and thus the communication throughput is improved.

Figure 7B:
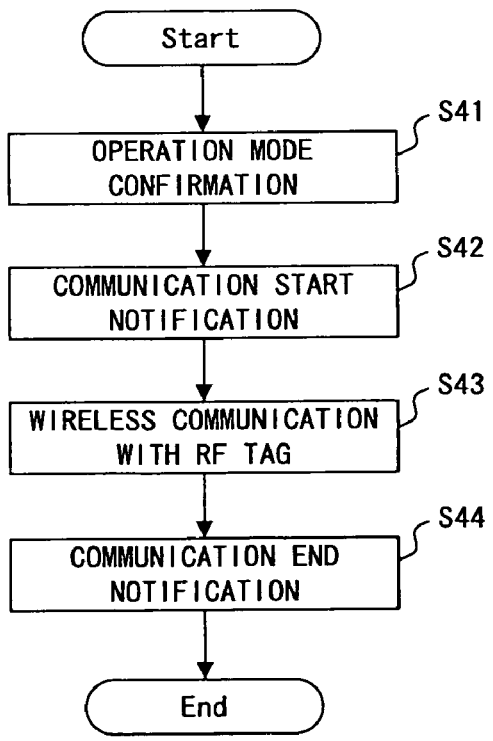
FIG. 7B is a detailed flowchart of the communication processing.

FIG. 7B is a detailed flowchart of the communication processing in step S23. In step S41, the operation mode information shown in FIG. 3A is confirmed. In step S42, a packet for notifying other reader/writers of the star of the communication with the RF tags 30 is generated and transmitted. The packet can be obtained by setting a number for identifying the selected channel as "channel number" and by setting "temporarily operation mode" or "persistent operation mode" as "status information" in FIG. 3B. In step S43, radio signals are transmitted/received with the RF tags 30. In step S44, a packet for notifying other reader/writers of the end of the communication with the RF tags 30 is generated and transmitted. The packet is obtained by setting a number for identifying the selected channel as "channel number" and by setting "non-communication" as "status information". It should be noted that in a case that the communication with the RF tags 30 cannot be performed (for example, a case that no response comes from the RF tags 30, or a case that communication error occurs), the communication in the selected channel is given up, and the next channel is selected in step S14.

Steps S24-S25 are executed in a case when the communication with the RF tags 30 is resumed. In other words, in step S24, with reference to the status management table shown in FIG. 4, the usage status of the channel, which is the same as the channel used in the communication processing in step S23, is determined. The channel is under "non-communication", the processing proceeds to step S23, and the communication with the RF tags 30 is resumed. On the other hand, if the channel is under "persistent busy", the processing proceeds to step S14, and the next channel is selected. If the channel is under "normal busy", whether or not the status of the channel is changed to "non-communication" within a prescribed time period is monitored. If the status of the channel is changed to "non-communication" within the prescribed time, the processing proceeds to step S23, and the communication with the RF tags 30 is performed, and in a case of time-out, the processing proceeds to step S14 and the next channel is selected.

As described above, in the RFID system 1, a plurality of reader/writers 10 share a plurality of channels for communicating with the RF tags 30 by each reader/writer autonomously executing the processing in the flowchart shown in FIG. 6. At that time, each of the reader/writers 10 searches for a channel to use autonomously. While two or more reader/writers execute steps S23-S25 in parallel, one channel can be shared by those reader/writers 10 by means of time-sharing. In other words, both of the available channel search and the channel time-sharing control can be realized by autonomous operation by each of the reader/writers. As a result, it is possible to perform the interference control between reader/writers efficiently.

In the RFID system 1, further detailed information relating to the usage status of each channel is notified the reader/writers. If a channel is estimated to be occupied continuously for long time by a reader/writer based on such a notification, the other reader/writers access to other channels without waiting for the release of the channel. Consequently, the time is not wasted in the time-sharing control, and effective channel search is realized.

It should be noted that in the above embodiment, "normal busy" and "persistent busy" were defined as channel usage status. If the "normal busy" is the normal state, "persistent busy" can be a stats where the channel is used by a reader/writer with high priority. That is, the RFID system 1 has a configuration, in which channels are shared by reader/writers with low priority by means of time-sharing, while each of the reader/writers with high priority occupies corresponding one channel. In the present invention, this configuration can be realized by the autonomous operation of each reader/writer 10. At that time, each reader/writer 10, when the selected channel is used by a reader/writer with priority higher than the reader/writer selecting the channel, selects another channel, and when the selected channel is used by a reader/writer with priority in the same level as or lower than the reader/writer selecting the channel, may wait for the end of the busy state without searching the next channel.

Each of the reader/writers 10 can detect the usage status of each channel by reference to the status management table in FIG. 4. Therefore each of the reader/writers 10 might select a channel to use from the channels under "non-communication", in step S1 of the flowchart in FIG. 6. Introduction of such procedures saves the trouble of reselection of another channel when the selected channel cannot be used, and efficient channel search can be realized.

However, when the number of the reader/writers 10 is greater than the number of channels provided by the RFID system 1, it is possible that all the channels are busy. In addition, depending on the interference level, a plurality of reader/writers 10 can use one channel at the same time as explained in connection with steps S21-S22. Therefore, in the system of the embodiment, the channels under busy state are to be selected as candidates of channels to use in step S1.

For further efficient channel search, however, the priority might be determined on the basis of the usage status of each channel when a channel is selected in steps S1 or S14. In such a case, first when channels under "non-communication" are present, a channel is selected from those channels. When a channel to be actually used cannot be obtained from the channels under "non-communication", a channel is selected from the channels under "normal busy". Furthermore, when a channel to be actually used cannot be obtained from the channels under "normal busy", a channel is selected from the channels under "persistent busy".

Figure 8:
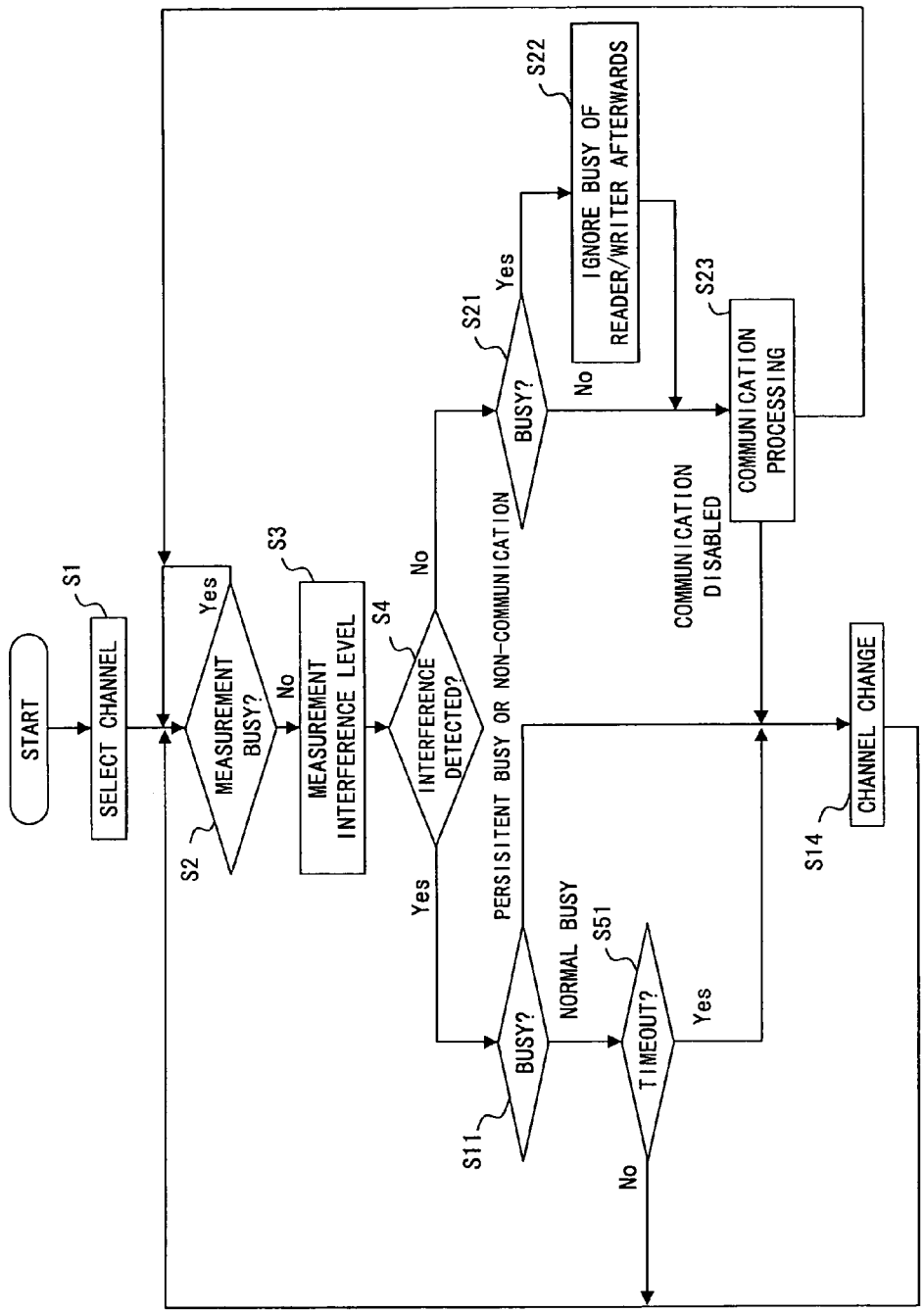
FIG. 8 is a flowchart showing an example of other operations of the reader/writers.

FIG. 8 is a flowchart showing another operation example of the reader/writers 10. Basic sequence of the flowchart is the same as the processing shown in FIG. 6. However, a procedure after the determination that the selected channel is under "normal busy" in step S11 and a procedure after the end of the communication processing in step S23 are different.

In the example shown in FIG. 8, when the selected channel is determined to be under "normal busy" in step S11, interference level of the selected channels is repeatedly detected in the prescribed time period in step S51. If the interference level is lowered to the threshold or less within the prescribed time period, the processing proceeds to step S21, and if not, the next channel is selected in step S14. According to this sequence, if the interference level is lowered during the channel search, the communication with the RF tags 30 via the selected channel can be started, therefore the search time is reduced.

In an example shown in FIG. 8, after the end of the communication processing in steps 23, in a case that the communication with the RF tags 30 resumes with the channel previously used, the interference level of the channel is redetected. Therefore, whether the channel can be used or not is determined on the basis of the latest interference level.

Figure 9:
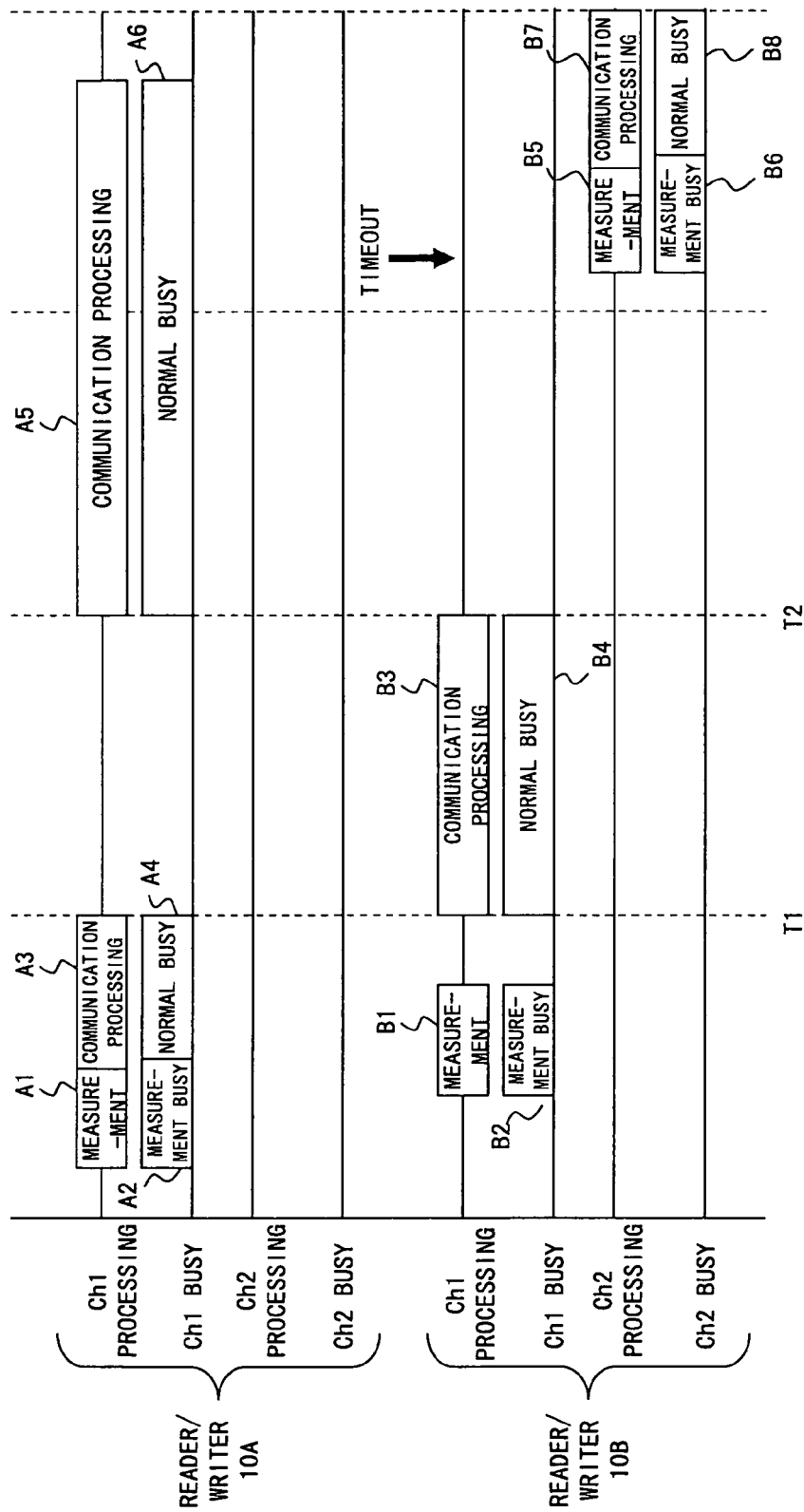
FIG. 9 is a time chart showing the operation of the RFID system when each of the reader/writers executes the processing of the flowchart of FIG. 6.

FIG. 9 is a time chart showing the operation of the RFID system 1 when each of the reader/writers 10 executes the processing of the flowchart of FIG. 6. Here, the RFID system 1 comprises two reader/writers 10A and 10B arranged being closed to each other.

The reader/writer 10A performs interference level measurement A1 of a channel CH1. During this period, the channel CH1 is under a measurement busy state A2. As a result of the measurement, if the interference level being at a threshold or less, the reader/writer 10A performs communication processing A3 for transmitting/receiving a radio signal to/from the RF tags 30. During this period, the channel CH1 is under a normal busy state A4. The usage status of the channel CH1 is notified other reader/writers (i.e. the reader/writer 10B).

The reader/writer 10B also performs the interference level measurement B1 of the channel CH1. During this period, the channel CH1 is under a measurement busy state B2. Since the channel CH1 is used by the reader/writer 10A at that time, the interference level would exceed the threshold. Therefore, the reader/writer 10B cannot start the communication with the RF tags 30. However, the channel CH1 used by the reader/writer 10A is not under the persistent busy state but the normal busy state. Hence, an end of busy waiting loop in steps S12-S13 in FIG. 6 is executed in the reader/writer 10B.

The reader/writer 10A, when ending the communication processing A3 at time T1, notifies the reader/writer 10B of the end. When detecting a situation that the status of the channel CH1 is changed to the non-communication state according to the notification, the reader/writer 10B performs communication processing B3 with the RF tags 30 using the channel CH1. As a result, the channel CH1 becomes a normal busy state B4. The usage status of the channel CH1 is notified the other reader/writer (i.e. the reader/writer 10A).

In the same manner, when the communication processing B3 is ended at time T2, the reader/writer 10B notifies the reader/writer 10A of the end. When detecting a situation that the status of the channel CH1 is changed to the non-communication state according to the notification, the reader/writer 10A performs communication processing A5 with the RF tags 30 using the channel CH1. As a result, the channel CH1 becomes a normal busy state A6.

Assume that the communication processing A5 is continued over the predetermined time period. As a result, when the end of busy waiting loop in steps S12-S13 of FIG. 6 is performed in the reader/writer 10B, time-out occurs. The reader/writer 10B, then, gives up waiting for the release of the channel CH1. Then the reader/writer 10B performs the interference level measurement B5 of the channel CH2, and afterwards, performs communication processing B7 using the channel CH2. Note that the status of the channel CH2 is under the measurement busy B6 while the measurement B5 is performed, and is under the measurement busy B8 while the communication processing B7 is performed.

As explained above, the channel CH1 is shared by the reader/writers 10A and 10B by means of time-sharing; however, if time-out occurs in the end of busy waiting loop, the channel CH2 is used. Therefore, it is possible to shorten the waiting time to obtain the channel, while using resources (i.e. channels between the reader/writer and the RF tags) effectively.

Note that if the reader/writer 10A performs the communication processing A3 using the channel CH1 under an assumption that "persistent operation mode" is set as the operation mode of the reader/writers 10 for example, the channel CH1 becomes persistent busy state. In this case, the reader/writer 10B immediately accesses the channel CH2, and performs the interference measurement without waiting for the end of the communication processing A3 by the reader/writer 10A.

Figure 10:
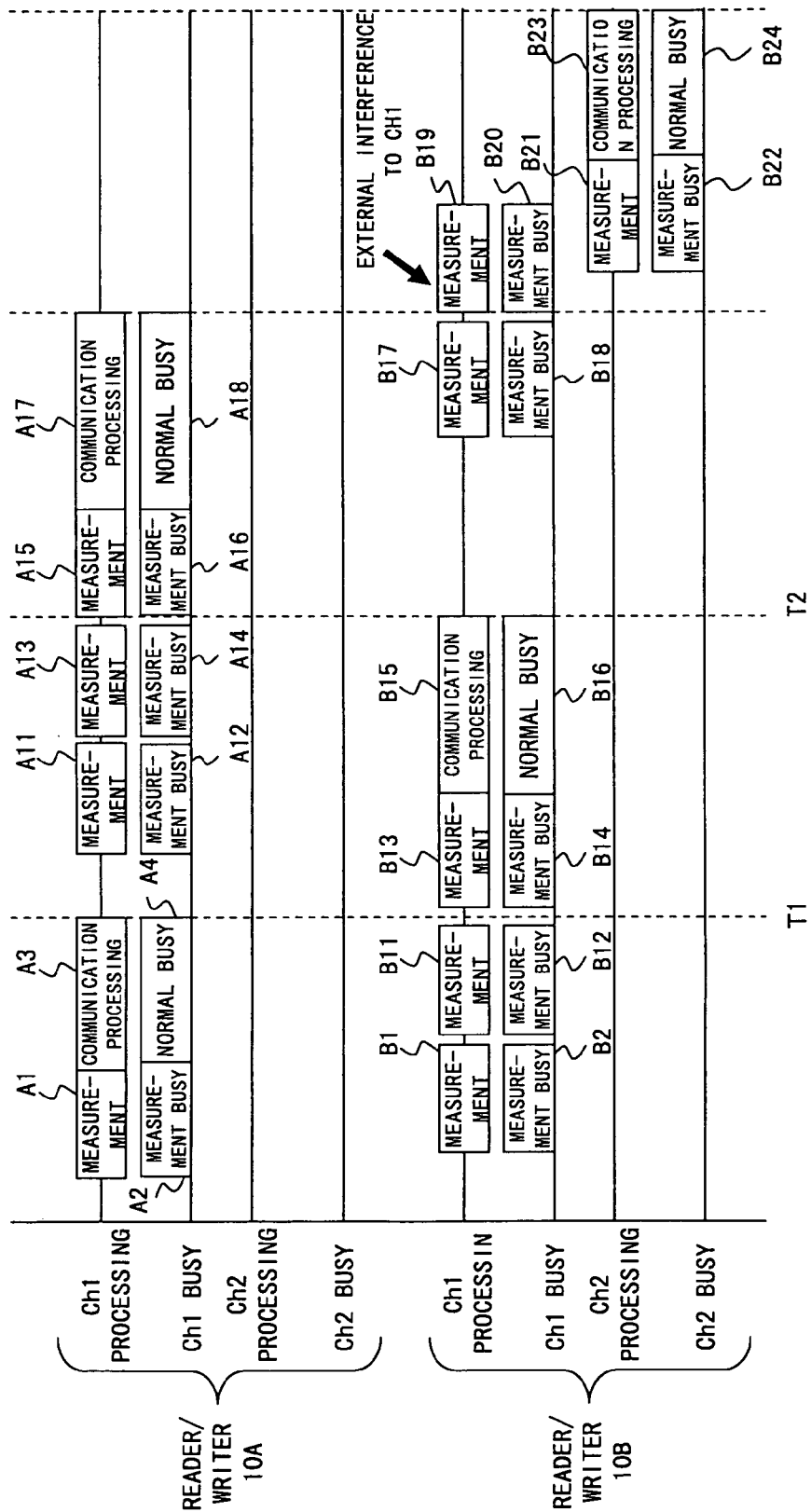
FIG. 10 is a time chart showing the operation of the RFID system when each of the reader/writers executes the processing in the flowchart of FIG. 8.

FIG. 10 is a time chart showing the operation of the RFID system 1 when each of the reader/writers 10 executes the processing in the flowchart of FIG. 8.

The reader/writer 10A performs the communication processing A3 after performing the interference level measurement A1 of the channel CH1 in the same manner as the example shown in FIG. 9. The reader/writer 10B also performs the interference level measurement B1 of the channel CH1. Since the channel CH1 is being used by the reader/writer 10A at that time, the interference level exceeds the threshold. The channel CH1 is under the normal busy state A4. Therefore, when the reader/writer 10B executes the step S11 of the flowchart of FIG. 8, it is determined to be "normal busy", and therefore the processing returns to step S2. The interference level measurements (B11, B13) are repeatedly executed until the channel CH1 is released. At that time, the channel CH1 becomes the measurement busy state (B12, B14) respectively. At the time T1 when the communication processing A3 of the reader/writer 10A ends and the interference level of the channel CH1 is lowered to the threshold or less in the measurement B13, the reader/writer 10B starts the communication processing B15. As a result, the channel CH1 becomes the normal busy state B16.

In the same manner, the reader/writer 10A repeatedly executes the interference level measurements (A11, A13, A15) until the channel CH1 can be used. At that time, the channel CH1 becomes the measurement busy state (A12, A14, A16) respectively. At the time T2 when the communication processing B15 of the reader/writer 10B ends and the interference level of the channel CH1 is lowered to the threshold or less in the measurement A15, the reader/writer 10A starts the communication processing A17. As a result, the channel CH1 becomes the normal busy state A18.

In addition, the reader/writer 10B executes the interference level measurements B17 and B19 of the channel CH1 in order to resume the communication with the RF tags 30. The channel CH1 at that time is the respective measurement busy state B18 and B20. However, in this example, external noise is generated on the frequency of the channel CH1 after the communication processing A17 by the reader/writer 10A is over. Consequently, when the reader/writer 10B executes the flowchart shown in FIG. 8, it is determined "Yes" in step S4, and also determined to be "non-communication" in step S11. Therefore, in such a case, the reader/writer 10B immediately switches the channel to be used from the channel CH1 to the channel CH2. The reader/writer 10B performs the interference level measurement B21 of the channel CH2, and afterwards performs the communication processing B23 using the channel CH2. Note that the channel CH2 becomes the measurement busy state B22 while the measurement B21 is performed, and becomes the normal busy state B24 while the communication processing B23 is performed.

As explained above, in the present embodiment, the interference level of a channel is measured periodically and repeatedly during the waiting time of the channel release, and in according with the result, it is determined whether the channel switch is performed or not. Therefore, when the channel becomes unusable state due to an external factor, immediate switching to another channel can be performed. Consequently, the waiting time for obtaining a channel can be shortened.

The present embodiment, when detecting the persistent busy state caused by the communication processing by other reader/writer, immediately switches the channel to use without waiting for the end of the communication processing.

It should be noted that the embodiments explained with reference to FIG. 2-10, defines only "normal busy" and "persistent busy" as the usage status of a channel while the reader/writers 10 performs communication with the RF tags 30; however, the present invention is not limited by the above embodiments. In other words, the system may define three statuses or more, and control channel search in accordance with the priority.

What is claimed is:

1. An interrogator used in a system including a plurality of interrogators, the interrogator comprising:
    a selection unit configured to select a channel from a plurality of channels in the system;
    an interference level detection unit configured to detect an interference level of the channel selected by the selection unit;
    a notification unit configured to notify one or more other interrogators in the system of at least one piece of notification information that includes
        channel identifying information which identifies one of the plurality of channels,
        usage status information to which one of a plurality of values that include a first value and a second value is set, and
        interrogator identifying information which identifies the interrogator;
    a reception unit configured to receive a piece of the notification information from any other one of the plurality of interrogators;
    a determination unit configured to determine whether the selected channel is usable on a basis of
        the usage status information included in a notified piece of the notification information that includes the channel identifying information identifying the selected channel and that has been notified from another interrogator and received by the reception unit and
        the interference level of the selected channel detected by the interference level detection unit;

a communication unit configured to perform wireless communication with a tag using the selected channel when the selected channel is usable;

a channel change unit configured to cause the selection unit to select another channel when the selected channel is not usable; and a memory configured to store operation mode information indicating one of a plurality of operation modes that include a first operation mode and a second operation mode, wherein when the communication unit starts the wireless communication with the tag using the selected channel, the notification unit generates a first or second piece of the notification information and notifies the one or more other interrogators of the generated first or second piece of the notification information, the first piece of the notification information includes information identifying the selected channel set as the channel identifying information, the first value set as the usage status information, and the interrogator identifying information, the second piece of the notification information includes the information identifying the selected channel set as the channel identifying information, the second value set as the usage status information, and the interrogator identifying information, the first value indicates that the interrogator identified by the interrogator identifying information occupies a channel identified by the channel identifying information continuously for a long time, the second value indicates that the interrogator identified by the interrogator identifying information temporarily uses a channel identified by the channel identifying information, the notification unit generates the first piece of the notification information if the operation mode information indicates the first operation mode when the communication unit starts the wireless communication with the tag using the selected channel, and the notification unit generates the second piece of the notification information if the operation mode information indicates the second operation mode when the communication unit starts the wireless communication with the tag using the selected channel.

2. The interrogator according to claim 1, wherein
the plurality of values include a third value, and
when the communication unit ends the wireless communication with the tag using the selected channel, the notification unit generates a piece of the notification information by setting the information identifying the selected channel as the channel identifying information and by setting the third value as the usage status information and notifies the one or more other interrogators in the system of the generated piece of the notification information.

3. The interrogator according to claim 2, wherein
the determination unit determines that the selected channel is not usable when the interference level of the selected channel exceeds a threshold and when the selected channel is identified by the channel identifying information included in a piece of the notification information that is notified of by another interrogator in the system and received by the reception unit and that includes the first value set as the usage status information.

4. The interrogator according to claim 2, wherein
the determination unit determines that the selected channel is not usable when the interference level of the selected channel exceeds a threshold and when the selected channel is identified by the channel identifying information included in a piece of the notification information that is notified of by another interrogator in the system and received by the reception unit and that includes the third value set as the usage status information.

5. The interrogator according to claim 2, further comprising
a monitor unit configured to monitor, when the interference level of the selected channel exceeds a threshold and the selected channel is identified by the channel identifying information included in a piece of the notification information that is notified of by another interrogator in the system and received by the reception unit and that includes the second value set as the usage status information, whether a particular piece of the notification information that includes the information identifying the selected channel as the channel identifying information and the third value set as the usage status information is received by the reception unit from another interrogator in the system within a prescribed time, wherein
the determination unit determines the selected channel is usable if the particular piece of the notification information is received by the reception unit within the prescribed time, and determines the selected channel is not usable if the particular piece of the notification information is not received by the reception unit within the prescribed time.

6. The interrogator according to claim 2, wherein
the determination unit determines, when the interference level of the selected channel is lower than a threshold, that the selected channel is usable regardless of which piece of the notification information is received by the reception unit from another interrogator in the system.

7. The interrogator according to claim 2, wherein
the interference level detection unit monitors whether the interference level of the selected channel becomes lower than a threshold within a prescribed time when the interference level of the selected channel exceeds the threshold and when the selected channel is identified by the channel identifying information included in a piece of the notification information that is notified of by another interrogator in the system and received by the reception unit and that includes the second value set as the usage status information, wherein
the determination unit determines the selected channel is usable if the interference level of the selected channel becomes lower than the threshold within the prescribed time, and determines the selected channel is not usable if the interference level of the selected channel does not become lower than the threshold within the prescribed time.

8. The interrogator according to claim 1, wherein
the plurality of values include a fourth value, and
when the interference level detection unit starts to detect the interference level, the notification unit generates a piece of the notification information by setting the information identifying the selected channel as the channel identifying information and by setting the fourth value as the usage status information and notifies the one or more other interrogators in the system of the generated piece of the notification information.

9. An interrogator used in a system including a plurality of interrogators, the interrogator comprising:
- a selection unit configured to select a channel from a plurality of channels for communication with a tag in the system;
- a notification unit configured to notify one or more other interrogators in the system of at least one piece of notification information that includes
  - channel identifying information which identifies one of the plurality of channels,
  - usage status information to which one of a plurality of values that include a first value and a second value is set, and
  - interrogator identifying information which identifies the interrogator;
- a reception unit configured to receive a piece of the notification information from any other one of the plurality of interrogators;
- a channel change unit configured to cause the selection unit to select another channel when a first piece of the notification information that includes information identifying the selected channel set as the channel identifying information and the first value set as the usage status information is received by the reception unit from one of the plurality of interrogators;
- a communication unit configured to perform wireless communication with a tag while sharing the selected channel with one or more other interrogators in a time-sharing manner when a second piece of the notification information that includes the information identifying the selected channel set as the channel identifying information and the second value set as the usage status information is received by the reception unit from one of the plurality of interrogators; and
- a memory configured to store operation mode information indicating one of a plurality of operation modes that include a first operation mode and a second operation mode, wherein when the communication unit starts the wireless communication with the tag using the selected channel, the notification unit generates a third or fourth piece of the notification information and notifies the one or more other interrogators of the generated third or fourth piece of the notification information, the third piece of the notification information includes the information identifying the selected channel set as the channel identifying information, the first value set as the usage status information, and the interrogator identifying information, the fourth piece of the notification information includes the information identifying the selected channel set as the channel identifying information, the second value set as the usage status information, and the interrogator identifying information, the third value indicates that the interrogator identified by the interrogator identifying information occupies a channel identified by the channel identifying information continuously for a long time, the fourth value indicates that the interrogator identified by the interrogator identifying information temporarily uses a channel identified by the channel identifying information, the notification unit generates the third piece of the notification information if the operation mode information indicates the first operation mode when the communication unit starts the wireless communication with the tag using the selected channel, and the notification unit generates the fourth piece of the notification information if the operation mode information indicates the second operation mode when the communication unit starts the wireless communication with the tag using the selected channel.

10. A system comprising:
a plurality of interrogators; and
a network configured to connect the plurality of interrogators, wherein each interrogator includes:
- a selection unit configured to select a channel from the plurality of channels;
- an interference level detection unit configured to detect an interference level of the channel selected by the selection unit;
- a notification unit configured to notify one or more other interrogators in the system of at least one piece of notification information that includes
  - channel identifying information which identifies one of the plurality of channels,
  - usage status information to which one of a plurality of values that include a first value and a second value is set, and
  - interrogator identifying information which identifies an interrogator including the notification unit;
- a reception unit configured to receive a piece of the notification information from any other one of the plurality of interrogators;
- a determination unit configured to determine whether the selected channel is usable on a basis of
  - the usage status information included in a notified piece of the notification information that includes the channel identifying information identifying the selected channel and that has been notified from another interrogator and received by the reception unit and
  - the interference level of the selected channel detected by the interference level detection unit;
- a communication unit configured to perform wireless communication with a tag using the selected channel when the selected channel is usable;
- a channel change unit configured to cause the selection unit to select another channel when the selected channel is not usable; and
- a memory configured to store operation mode information indicating one of a plurality of operation modes that include a first operation mode and a second operation mode, wherein when the communication unit starts the wireless communication with the tag using the selected channel, the notification unit generates a first or second piece of the notification information and notifies the one or more other interrogators of the generated first or second piece of the notification information, the first piece of the notification information includes information identifying the selected channel set as the channel identifying information, the first value set as the usage status information, and the interrogator identifying information, the second piece of the notification information includes the information identifying the selected channel set as the channel identifying information, the second value set as the usage status information, and the interrogator identifying information, the first value indicates that the interrogator identified by the interrogator identifying information occupies a channel identified by the channel identifying information continuously for a long time, the second value indicates that the interrogator identified by the interrogator identifying information temporarily uses a channel identified by the channel identifying information, the notification unit generates the first piece of the notification information if the operation mode information indicates the first operation mode when the communication unit starts the wireless communication with the tag using the selected channel, and the notification unit generates the second piece of the notification information if the operation mode information indicates the second operation mode when the communication unit starts the wireless communication with the tag using the selected channel.

11. The interrogator according to claim 1, wherein the reception unit receives the piece of notification information via a network to which the plurality of interrogators are connected.

12. The interrogator according to claim 9, wherein the reception unit receives the piece of notification information via a network to which the plurality of interrogators are connected.

13. The system according to claim 10, wherein the reception unit receives the piece of notification information via the network.

* * * * *